July 19, 1927.
G. P. CUGNIN
AMUSEMENT DEVICE
Filed Sept. 4, 1926
1,636,356
2 Sheets-Sheet 1
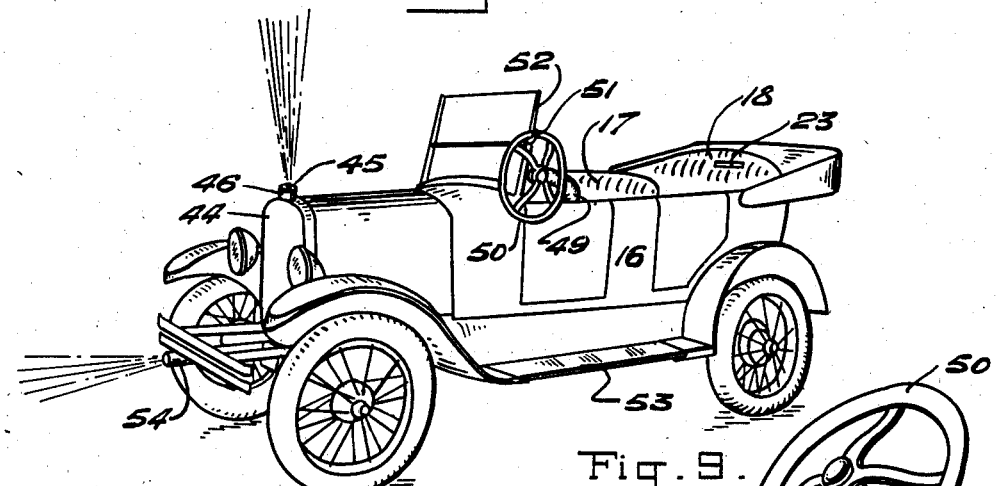
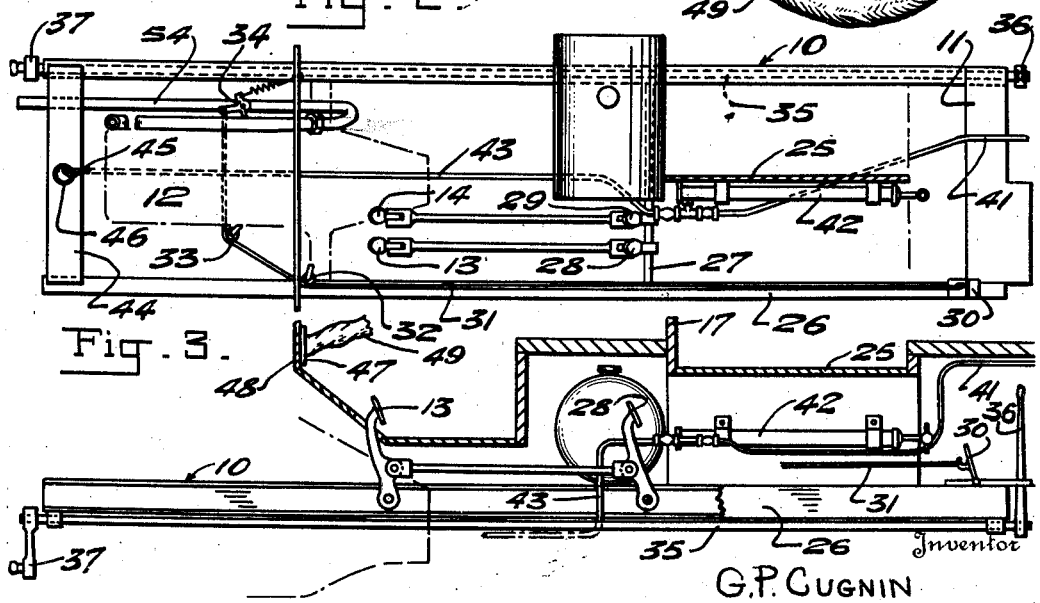
G. P. CUGNIN
By Watson E. Coleman.
Attorney July 19, 1927.

G. P. CUGNIN

AMUSEMENT DEVICE

Filed Sept. 4, 1926

Inventor
G. P. Cugnin
By Watson E. Coleman
Attorney

Patented July 19, 1927.

1,636,356

UNITED STATES PATENT OFFICE.

GEORGE P. CUGNIN, OF ERIE, PENNSYLVANIA.

AMUSEMENT DEVICE.

Application filed September 4, 1926. Serial No. 133,688.

This invention relates to amusement devices and more particularly to a means for modifying the construction of a well known type of vehicle to enable the same to be actually driven by a concealed driver while apparently being controlled by a second person, so that the automobile may be operated and controlled while apparently unattended.

A further object of the invention is to provide a device of this character wherein the dummy operator is provided with a dummy steering wheel flexibly connected with the body of the vehicle, so that it may be moved from place to place in the vehicle and thus give the appearance of control of the machine by the dummy operator from any desired point therein.

A further object of the invention is to provide auxiliary devices upon the automobile enabling the same to be employed in a series of ludicrous instances through which its movements and operation are controlled by the concealed driver.

These and other objects I attain by the construction shown in the accompanying drawings, wherein for the purpose of illustration is shown a preferred embodiment of my invention and wherein:—

Figure 1 is a perspective view of an automobile embodying the features of my invention;

Figure 2 is a plan view of the chassis frame thereof;

Figure 3 is a longitudinal sectional view therethrough;

Figure 9 is a perspective view of the dummy steering wheel and the connections thereof.

Figure 4:
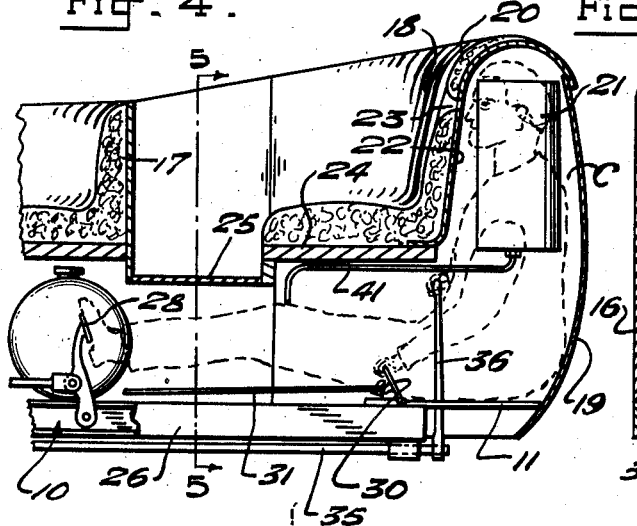
Figure 4 is an enlarged detail sectional view through the rear end of the vehicle showing the operator's compartment.

Referring now more particularly to the drawings, the numeral 10 generally designates the chassis frame of a vehicle including a rear cross member 11. This chassis frame supports the usual engine 12 which is that of a well known type of vehicle including a planetary transmission having control pedals 13 and 14. A body 16 is applied to this frame, this body including driver's and rear seats 17 and 18. The rear wall 19 of the body is spaced from the adjacent face of the cushion 20 at the back of the rear seat, so that a space is provided between such rear wall and the back cushion accommodating the head and shoulders of an operator and a tank 21, the purpose of which will hereinafter appear.

Figure 5:
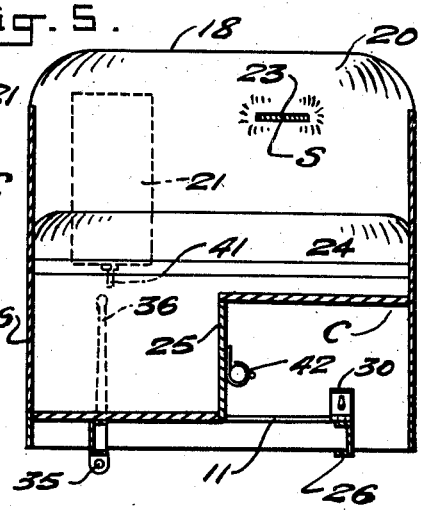
Figure 5 is a section on the line 4—4 of Figure 4.
Figure 6:
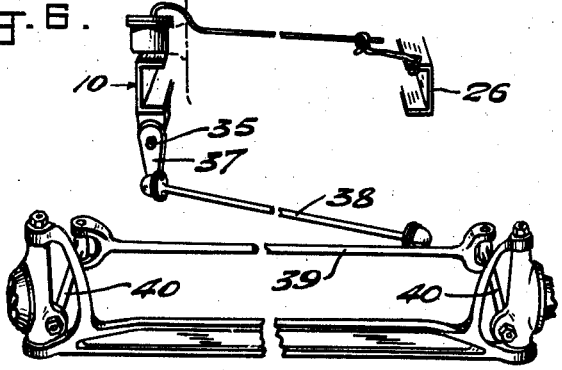
Figure 6 is a detail perspective of portions of the frame showing the manner of connecting the steering apparatus.
Figure 7:
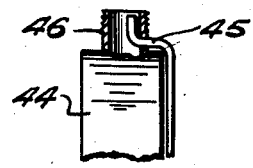
Figure 7 is a fragmentary detail showing the manner of connecting the conduit with the radiator of the vehicle.
Figure 8:
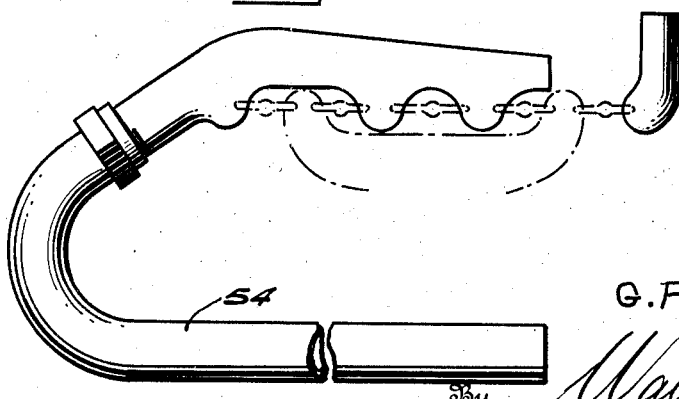
Figure 8 is a detail side elevation showing the manner in which the exhaust pipe is reverted.

Through the rear cushion and the plate 22 employed to reinforce the same, an opening 23 is formed at a level with the eyes of an operator arranged within the compartment C and at a higher level than the upper edge of the back of the driver's seat 17. This opening may be concealed by stitching S in the rear cushion simulating a patch. The operator, when positioned within the compartment C, is seated upon the rear cross member 11 and has his legs extended beneath the seat bottom 24 of the rear seat and through a compartment formed by raising the deck 25 of the vehicle between the rear and front seats. This raise in the deck, as more clearly shown in Figure 5, may be made to simulate a box inserted in the vehicle.

Beneath the front seat, the side members 26 of the frame are connected by a transversely extending pivot rod 27 upon which are hinged pedals 28 and 29 adapted to be engaged by the feet of the operator and link-connected with the pedals 13 and 14 respectively, so that these pedals may be controlled by the operator. Upon the left hand side member of the frame is pivoted a control lever 30 which is connected by a suitable flexible element 31 trained over pulleys 32 and 33 with the throttle 34 of the engine. Beneath the opposite or right hand side member 26 of the frame, a longitudinally extending rod 35 is journaled, the rear end of this rod being provided with an operating handle 36 extending into the compartment C and swingable in a plane transverse to the vehicle. The forward end of this rod has secured thereto an arm 37 which is link-connected, as at 38, with the usual tie rod 39 connecting the steering arms 40 of the vehicle. It will thus be seen that complete control of the movements of the vehicle may be had from the compartment C.

From the tank 21 arranged within the compartment C, a conduit 41 leads to a pump 42, the handle of which is arranged within the compartment C and adjacent to the driver of the vehicle. From this pump, a conduit 43 is led to the radiator 44 of the vehicle and is there connected with the usual overflow vent pipe 45 of the radiator. As is well known to those familiar with the art, this vent pipe opens upwardly through the filling neck 46 of the radiator at its upper end and accordingly by operation of the pump, the concealed operator is enabled to eject from this filling neck a stream of fluid from the tank 21.

Within the front seat compartment of the machine, a bracket 47 is secured to the dash 48 of the vehicle and connected by a flexible tubing 49 with a steering wheel 50 of the type usually employed upon the vehicle. This flexible connection permits the steering wheel to be moved to any part of the vehicle and to be hung upon a hook 51 carried by the windshield frame 52 of the vehicle. The machine is further provided with a resilient running board 53 replacing the usual running board. In order to protect the operator concealed within the compartment C from the noxious and dangerous fumes of the exhaust and to add to the ludicrous appearance of the machine, the exhaust pipe 54 is reverted, so that it discharges at the front instead of at the rear of the machine.

It will be obvious that a machine of this character is particularly well adapted for use in comedy acts at fairs, carnivals and the like, where sufficient space is provided for its operation. The dummy operator of the machine may leave the machine and the machine may be operated by the concealed operator and give the appearance of chasing the operator or other person. Since the exhaust is discharged at the front of the vehicle and the usual muffler is dispensed with, the machine has the appearance of spitting fire at the chased person. The dummy operator may move to any portion of the vehicle and apparently control the operation of the vehicle therefrom. If, in leaving the vehicle, he steps upon the running board 53, the resilient material employed will give way, apparently precipitating him to the ground. When he attempts to inspect the radiator of the engine, he may be met by a gush of water from the tank 21.

Since the construction hereinbefore described is obviously capable of a certain range of change and modification without materially departing from the spirit of the invention, I do not limit myself to such specific structure except as hereinafter claimed.

I claim:—

1. In combination with an automobile having the usual driver's and rear seats and deck, a compartment formed beneath the deck and extending partially behind the rear seat for the accommodation of an operator, controls for the automobile likewise concealed beneath the deck and extending to said space and a dummy steering wheel occupying the position ordinarily occupied by the usual steering wheel of the vehicle, said dummy steering wheel being flexibly connected with the vehicle and shiftable to various parts thereof.

2. In combination with an automobile having the usual driver's and rear seats and deck, a compartment formed beneath the deck and extended partially behind the rear seat for the accommodation of an operator, controls for the automobile likewise concealed beneath the deck and extending to said space and a dummy steering wheel occupying the position ordinarily occupied by the usual steering wheel of the vehicle, the front wall of the rear seat having a concealed opening formed therein permitting view by the operator.

3. In combination with an automobile having the usual driver's and rear seats and deck, a compartment formed beneath the deck and extended partially behind the rear seat for the accommodation of an operator, controls for the automobile likewise concealed beneath the deck and extending to said space, a dummy steering wheel occupying the position ordinarily occupied by the usual steering wheel of the vehicle and means operable by the operator for discharging a stream of fluid through the filling neck of the radiator of the automobile.

In testimony whereof I hereunto affix my signature.

GEORGE P. CUGNIN.